United States Patent [19]
Carscallen

[11] Patent Number: 5,845,482
[45] Date of Patent: Dec. 8, 1998

[54] COMBINED BLEED VALVE AND ANNULAR DIFFUSER FOR GAS TURBINE INTER COMPRESSOR DUCT

[76] Inventor: William E. Carscallen, 78 Topley Crescent, Ottawa, Ontario, Canada, K1G 4M6

[21] Appl. No.: 817,332
[22] PCT Filed: Oct. 5, 1995
[86] PCT No.: PCT/CA95/00552
 § 371 Date: Mar. 27, 1997
 § 102(e) Date: Mar. 27, 1997
[87] PCT Pub. No.: WO96/11340
 PCT Pub. Date: Apr. 18, 1996

[30] Foreign Application Priority Data

Oct. 6, 1994 [CA] Canada ................................. 2133793

[51] Int. Cl.⁶ ....................................................... F02C 6/18
[52] U.S. Cl. ........................................ 60/39.07; 60/226.3
[58] Field of Search .................................. 60/226.3, 262, 60/39.07

[56] References Cited

U.S. PATENT DOCUMENTS

| | | |
|---|---|---|
| 5,048,280 | 9/1991 | Stransky . |
| 5,119,625 | 6/1992 | Glowacki ................................ 60/226.3 |
| 5,261,228 | 11/1993 | Shuba ..................................... 60/226.3 |
| 5,279,109 | 1/1994 | Liu . |
| 5,515,673 | 5/1996 | Leclerrco et al. ...................... 60/226.3 |
| 5,694,768 | 12/1997 | Johnson et al. ........................ 60/266.3 |

FOREIGN PATENT DOCUMENTS

| | | |
|---|---|---|
| 374004 | 6/1990 | European Pat. Off. . |
| 2349740 | 11/1977 | France . |
| 814745 | 6/1959 | United Kingdom . |
| 932000 | 7/1963 | United Kingdom . |
| 2243871 | 11/1991 | United Kingdom . |

*Primary Examiner*—Charles G. Freay

[57] ABSTRACT

A multi-spool gas turbine engine of the type having an annular inter compressor duct connecting a low pressure compressor to a further compressor stage, and having improved bleed means for bleeding off a variable amount of air from the duct when the engine is being operated at partial load. The bleed means comprises opening means arranged circumferentially around the outer wall of the duct, and pivotally mounted air deflectors for deflecting air flowing in the duct outwardly through the openings in the outer wall of the duct. In accordance with the invention, the air deflectors are flaps forming a circumferential array, and sealing elements are provided movable with the flaps and interconnecting the side edges of adjacent flaps to largely prevent radial flow of air between adjacent flaps.

7 Claims, 6 Drawing Sheets

COMBINED BLEED VALVE AND ANNULAR DIFFUSER FOR GAS TURBINE INTER COMPRESSOR DUCT

BACKGROUND OF THE INVENTION

1. Technical Field of the Invention.

The present invention relates to gas turbines, especially gas turbine aeroengines adapted for terrestrial uses such as generation of electricity.

2. Background Art.

Gas turbine aeroengines are sometimes adapted for terrestrial uses in which a constant speed is required, for example a speed of 3,000 or 3,600 rpm when driving electrical generators to produce electricity at 50 or 60 Hz. A problem arises with such engines when run at partial load, since the rotational speed of the low pressure compressor (LPC) which is coupled to the generator is fixed and thus the amount of compressed air delivered to the next compressor stage, which is usually the intermediate pressure compressor (IPC), would normally be constant and would be more than that required by the engine core. In order to alleviate this problem it is usual to bleed air from the inter compressor duct (ICD) to atmosphere. The ICD is typically a converging annular duct, "swan necked" in cross section, which joins the LPC to the IPC. This bleeding of air is problematic for two reasons. Firstly, it affects the flow of air within the ICD and increases its total pressure loss. Secondly, it results in poor distribution of flow at the inlet to the IPC which causes off-design operation of the compressor and a reduction in efficiency.

The ICD bleed-off can be seen as a flow bifurcation with two significant features: the bleed air flow experiences a sudden expansion exterior to the swan-neck air duct, while the main flow remaining within the duct effectively experiences an increase in area, an adverse pressure gradient and poor diffusion which can cause boundary layer separation, especially at the inner ICD wall. The latter flow is governed by the principles of subsonic diffusion for which the area ratio (AR) and non-dimensional wall length (L/D) are the principle determinants of optimum geometry for straight walled diffusers.

Up until now, the excess air has been bled off in one of two ways. In one method excess air is bled off by an assembly of discrete, circumferentially spaced bleed flaps located on the outer wall of the ICD. These bleed flaps open outwards, being hinged at their upstream ends. U.S. Pat. No. 5,261,228 to Shuba entitled "Apparatus for Bleeding Air" describes an apparatus that is typical of this arrangement. Shuba uses ten bleed valves 44 which are circumferentially spaced apart from each other around the axis of the engine. The other method is described in U.S. Pat. No. 5,279,109 of Liu et al. entitled "Gas turbine engine variable bleed pivotal flow splitter". Their method employs a circumferentially disposed plurality of pivotal flow splitters which are pivotally mounted at their downstream ends and which have means to pivot the leading edges of the splitters into the compressor flowpath. In both cases the bleed valves or splitters have their adjacent edges spaced apart and provide a discontinuous surface for diverting the flow outwardly.

Both concepts result in air being bled off from the outer wall of the ICD and can be categorised as wide angled, non-continuous diffusers. The method by which they bleed off air is problematic for two reasons. First, it affects the entire flow field within the ICD; as far as the flow remaining in the ICD is concerned, there is now a sudden area increase (low ratio of L/D) in the vicinity of the open bleed valves, and this represents a major problem with the local diffusion. This geometric configuration can cause flow separation on the inside wall of the ICD especially at large bleed flow rates when the effective area ratio of the continuing main flow is large. Because of the local diffusion and possible separated flow, pressure losses occur and result in poor distribution of velocity and total pressure at the inlet to the IPC. Secondly, the three-dimensional nature of this poor flow distribution at the inlet to the IPC results in off-design operation of the compressor stage and a reduction in efficiency.

DISCLOSURE OF THE INVENTION

The present invention is based on the realization that arrangements similar to those presently being used for variable area nozzles of jet engines may be adapted to provide a structure suitable for deflecting air flow in an ICD outwardly through openings in the outer wall of the duct, and which overcomes drawbacks of the prior art. This type of variable area nozzle is composed of a circumferential array of overlapping leaves or flaps which are hinged near one end.

Specifically, the present invention is concerned with a multi-spool gas turbine engine having an annular inter compressor duct (ICD) connecting a low pressure compressor to a further compressor stage, the duct having an inner wall and an outer wall and a central axis, in which there is provided bleed means for bleeding off a variable amount of air from the duct. The bleed means comprises opening means arranged circumferentially around the outer wall of the duct, pivotally mounted air deflector means for diverting air flowing in the duct outwardly through the opening means, and means for simultaneously pivoting the deflector means into the path of air flowing in the duct. In accordance with this invention, the air deflector means comprises a circumferential array of flaps each having inner and outer surfaces, a downstream inner end and side edges, the flaps being pivotally mounted so as to be movable between an outer position at which the flaps lie close to the outer wall and effectively close the opening means, and an inner position in which the flaps have their downstream inner ends adjacent the outer wall and have their outer surfaces inclined inwardly from the outer wall to divert some of the air flowing in the duct outwardly through the opening means. Also, sealing elements are provided movable with the flaps and providing interconnection between the side edges of adjacent flaps to largely prevent radial flow of air between adjacent flaps when the flaps are in their outer positions.

The sealing elements may be leaves having their edges overlapping with the side edges of adjacent flaps, or their edges may be slidable in slots in the side edges. Alternatively, the sealing elements may be extensions of the side edges which overlap with the edges of adjacent flaps.

The means for causing simultaneous pivotal movement of the flaps may include an actuator ring movable axially relative to the duct.

The generally known structure for variable area jet engine nozzles may provide either a converging nozzle or a converging/diverging nozzle; the present invention makes use only of the structure similar to that of a converging nozzle. In effect, this variable area nozzle structure is installed backwards in the ICD so that the air flow is into what would normally be the exit end of the nozzle. The nozzle structure is such that when at its maximum diameter, the leaves or flaps conform to the outer wall of the ICD, covering the opening means and giving little interference to the flow of air through this duct. If there is a need to bleed off air, the deflector formed by the flaps is partially closed and will then become a variable inlet annular diffuser which cleanly divides the flow into two annular streams. The outer annular stream will undergo a sudden expansion through the duct wall opening means, while the inner annular main stream will pass into the annular diffuser, and will be diffused to fill the entire ICD cross-section.

The preferred embodiment allows the effectiveness of the diffuser to be further optimised by bleeding off the boundary layer on the inner surface of the ICD. This boundary layer, which originates within the LPC, is thick, tired (normal velocity gradient at the wall is nominally zero), and near incipient separation. As a result, it will have difficulty negotiating the interior convex surface of the ICD wall. This problem can be eliminated by bleeding off, into a plenum, the boundary layer through that part of the internal ICD wall which is near to or forms part of the diffuser section, and then exhausting the plenum into the main bleed-off air volute case via internal radial passages through the LPC outlet guide vanes.

The preferred embodiment also allows further optimisation of the variable inlet area annular diffuser operation by constructing the diffuser flaps, or leaves therebetween, with some porosity and allowing the boundary layer grown on the inside surface of the flaps to bleed off to the main plenum.

The preferred embodiment further allows the leading edge geometry of the ICD bleed valve to have reduced sensitivity to varying airstream inlet incidence angles. In order to alleviate the possibility of air flow induced vibrations of the diffuser flaps the geometry of the leading edge can vary in the circumferential and/or axial direction and/or radial directions. The leading edge will normally be made tapered.

The technology for controlling and driving the nozzle flaps is well established for jet engine nozzles. The actuator means, including for example an actuator ring, control linkages, etc. can be placed outside of both of the annular air streams and as such losses can be kept to a minimum.

With this invention, the known wide-angled non-continuous diffusers presently used, and which are known to be prone to bad flow separations, poor flow distributions and high losses, are replaced with a well designed annular diffuser. This yields two benefits. The velocity and total pressure distributions seen at the inlet to the IPC are more uniform and both of these support improved compressor stage operation and efficiency.

BRIEF DESCRIPTION OF THE DRAWINGS

A preferred embodiment of the invention will now be described by way of example with reference to the accompanying drawings, in which.

DETAILED DESCRIPTION

Figure 1:
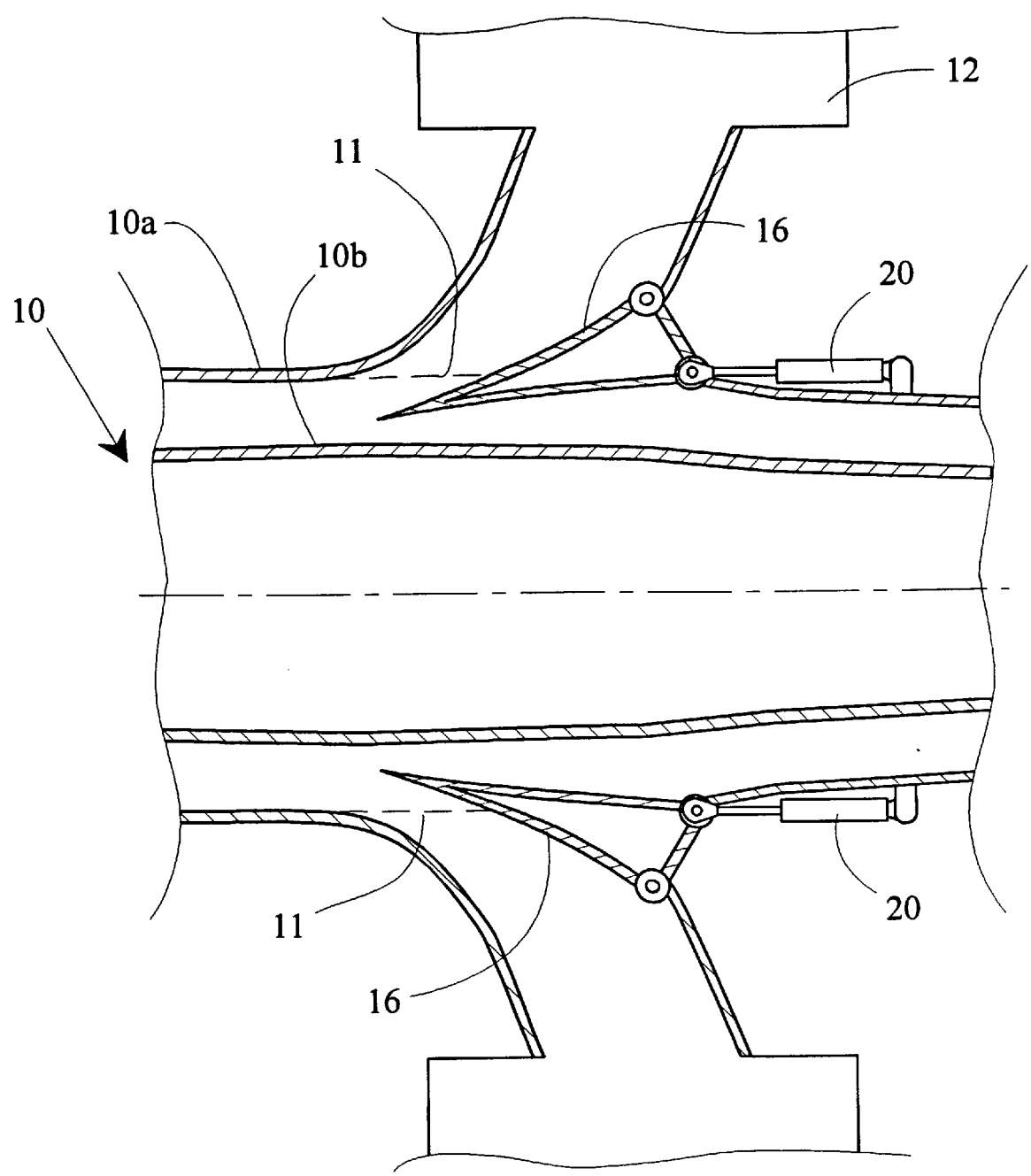
FIG. 1 is a longitudinal section of part of an annular ICD showing a flap arrangement of the kind which can provide an annular diffuser in accordance with the invention.
Figure 2A:
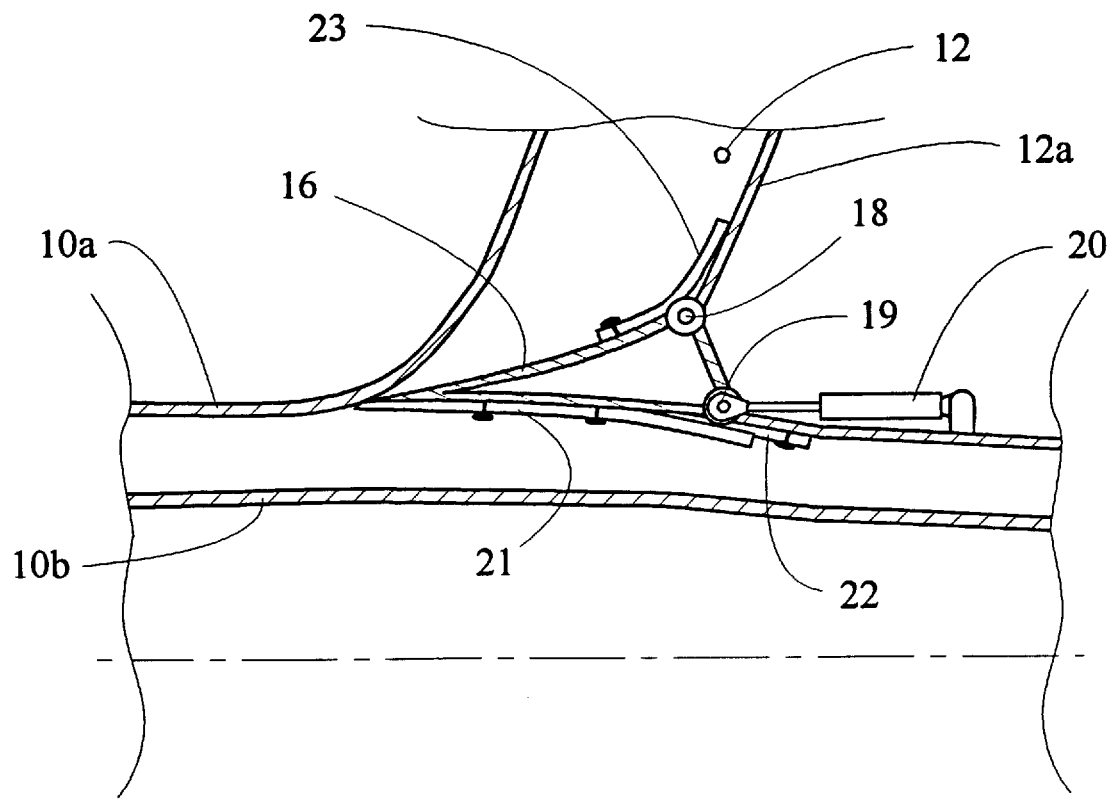
FIGS. 2a and 2b are enlarged longitudinal sectional views of a portion of an annular duct showing how movable flaps may be mounted in such a duct to provide an annular diffuser as part of a bleed valve, and showing two positions of such flaps.
Figure 2B:
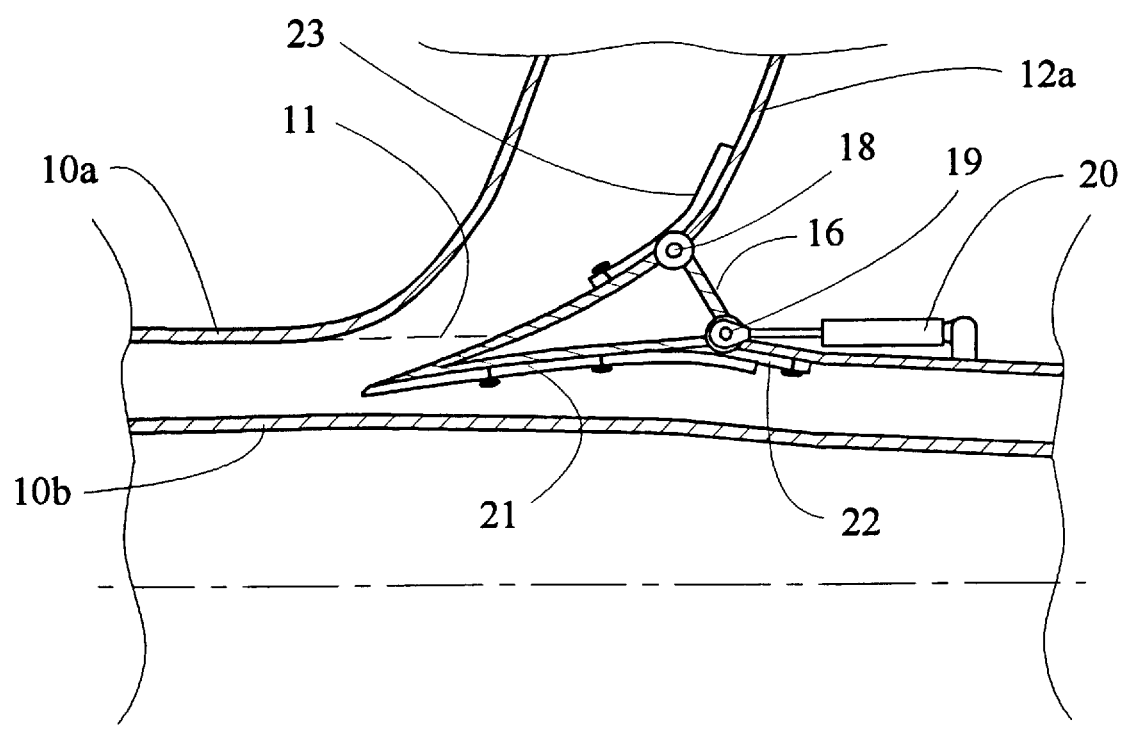

FIGS. 1, 2a and 2b show an annular diffuser in accordance with the invention, and show how this is mounted in an ICD. These drawings show annular duct 10 as having an outer wall 10a and an inner wall 10b. A central part of the outer wall has openings 11, which communicate with a plenum 12. A circumferential array of movable flaps 16 extends around the duct; these are located so that when in an outermost position (FIG. 2a) they cover the openings 11, and when angled inwardly from this position (FIG. 2b) they can deflect a portion of the air flowing in the duct outwardly through the openings 11.

FIGS. 2a and 2b show typical flaps 16 and their method of movement. Each flap, when seen in longitudinal section, has the form of a flattened triangle, but with a slight cylindrical curvature centered on the axis of the duct, and has a sharply tapering upstream end portion. Each flap is pivoted at a downstream outer corner 18, and each is connected at a downstream inner corner 19 to a hydraulic cylinder 20 capable of pivoting the flap between the positions shown in FIGS. 2a and 2b. It will be apparent that in the first position the inner walls of the flaps close the openings 11 and allow relatively smooth flow uninterrupted flow of air in the duct, while in the second position a significant portion of the air is smoothly diverted outwardly through the openings 11. The inclination of the flaps can be controlled by the series of cylinders 20.

Alternatively, instead of having separate cylinders for each flap, the pivots 19 could all be connected to an actuator ring, itself movable by a few hydraulic cylinders. This form of construction is known in the art of variable outlet jet engine nozzles.

The flaps 16 are arranged as a circumferential array, designed to have only small gaps between the side edges of the flaps when in their innermost position (FIG. 2b). In their outermost positions there will of course be larger gaps between these edges. In accordance with known practice for jet engine variable nozzles, flexible leaves 21 are provided extending across these gaps. Each leaf may be attached to the flap on one side and overlaps and slides relative to the next adjacent flap. Other sealing arrangements, already known in jet engine nozzles, are possible; for example leaves may slide in slots in the sides of the flaps; or the sealing elements may be extensions of the flaps themselves, with overlapping relationship with adjacent flaps.

Additional flexible sealing elements 22 and 23 are provided at the downstream ends of the flaps, to provide a smooth transition between these ends of the flaps and adjacent surfaces of the ICD and rear plenum wall 12a. The elements 22 have their rear ends fixed to the ICD outer wall 10a, and their front (upstream) ends slide in recesses behind the rear ends of leaves 21, and overlap with the leaves so that a substantially smooth transition is provided. Elements 23 are fixed at their upstream ends to the outer surfaces of flaps 16, and slide relative to wall 12a. Both series of elements 22 and 23 extend fully around the circumference of the ICD.

Figure 3:
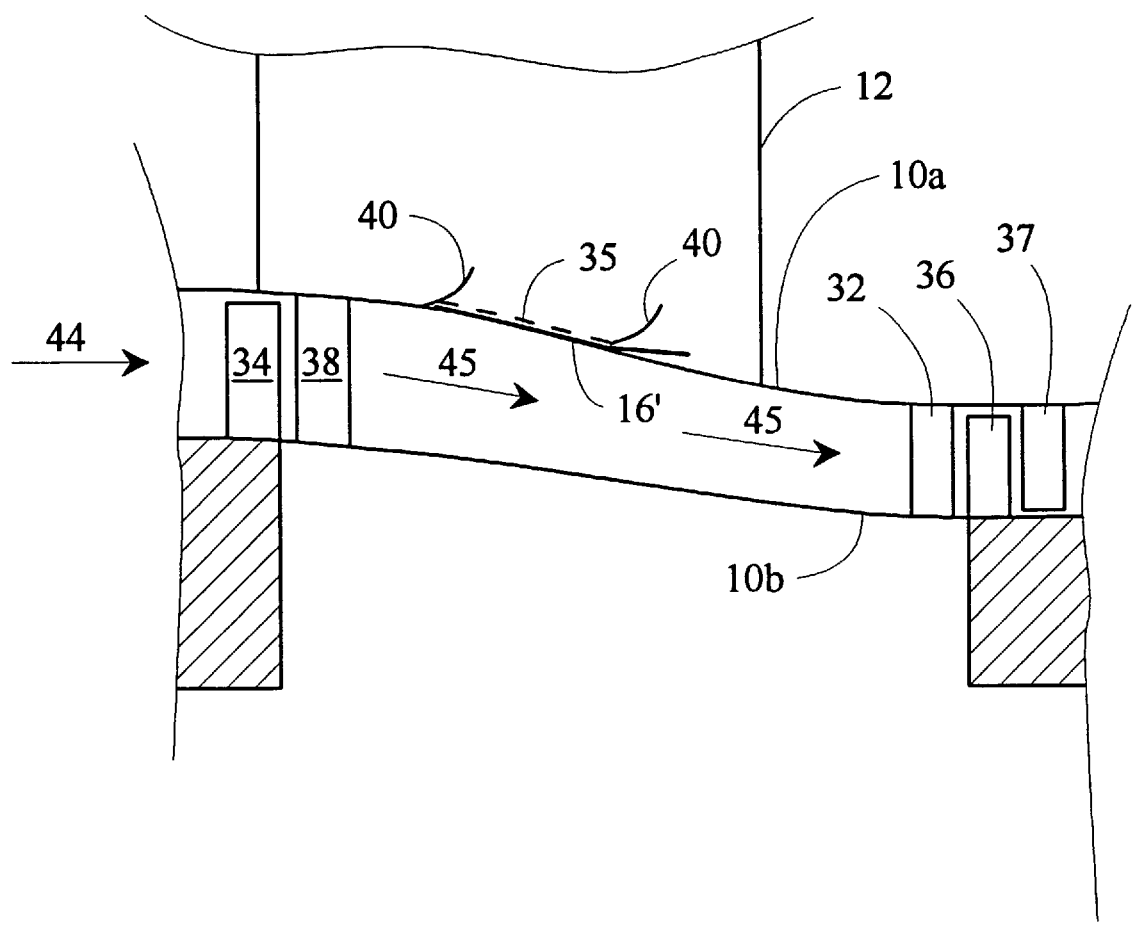
FIG. 3 is a diagrammatic view of an ICD incorporating the invention, with the bleed valve in the closed position, and showing the relationship to the LPC and the IPC.

FIG. 3 shows diagrammatically a longitudinal section of the "swan necked" shaped annular ICD of a typical multi-spool aero-derivative gas turbine engine, located between the last stage of the IPC (represented by rotor blades 34, outlet guide vanes 38) and the first stage and a half of the IPC (represented by inlet guide vanes 32, rotor blades 36 and stators 37). In these and subsequent drawings, flaps 16' are shown as flat plates for simplicity, but it will be understood that flaps of the kind shown at 16 in FIGS. 2a and 2b are preferred.

As before, the ICD is composed of two concentric walls, the outboard wall 10a and the inboard wall 10b. The outboard wall has an annular section 35 with openings 11 located adjacent to flaps 16'. Attached (directly or indirectly) to the outboard wall 10a of the ICD is a plenum or volute case 12 into which the bleed air is discharged from the ICD. The flaps 16' of the diffuser are shown in the outermost position in which the bleed valve is closed. The bleed flow is guided into the plenum or volute case by annular curved guide vanes shown at 40. The partially compressed LPC air is shown at 44, and the air entering the IPC is shown at 45.

Figure 4:
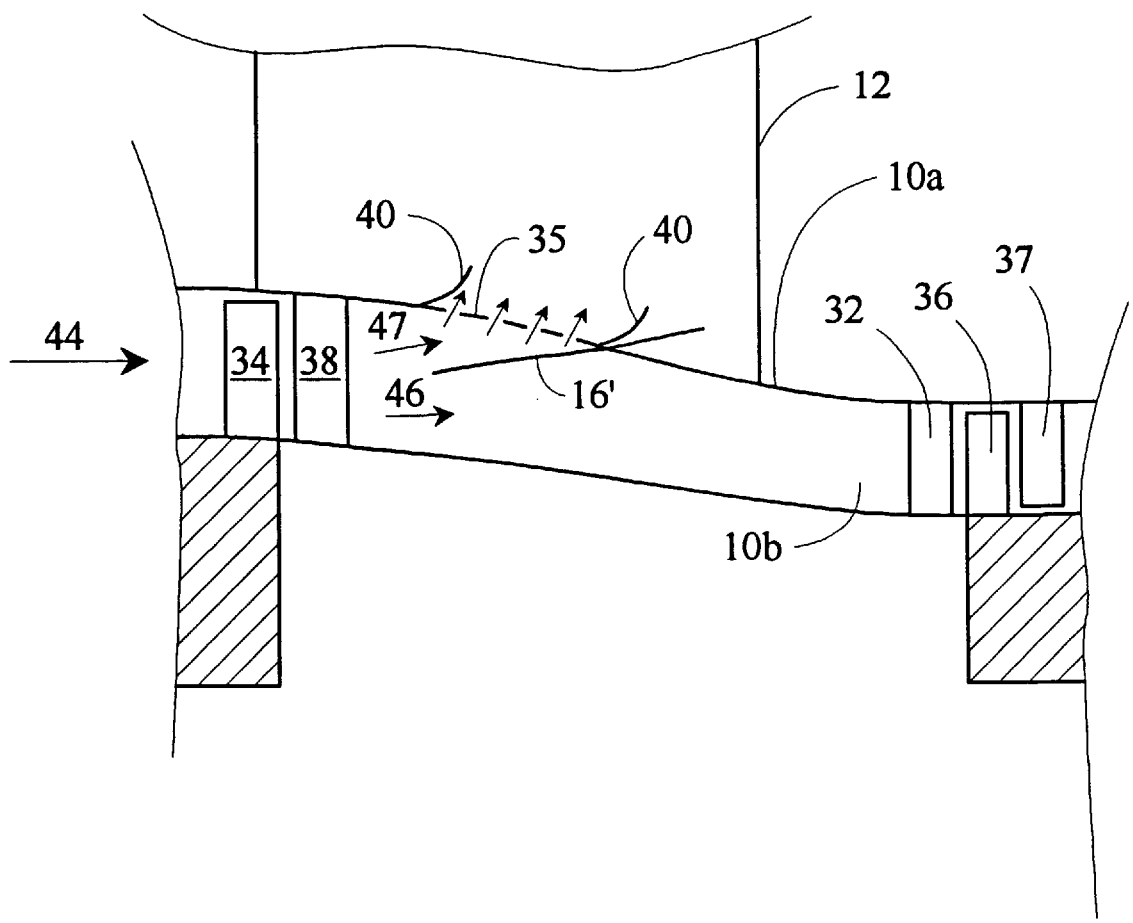
FIG. 4 is similar to FIG.3, except that the ICD bleed valve is in the open position.

FIG. 4 is the same as FIG.3 except that the bleed valve is shown in the open position, i.e. flaps 16' are shown in the retracted condition in which they bifurcate air stream 44 into two annular airstreams, 46 and 47. Airstream 46 is diffused in a controlled fashion between the main portion of the flaps 16' and the inboard surface 10b of the ICD downstream of the flaps. Airstream 47 is bled from the ICD through the openings in porous section 35, and guided into the plenum or volute case by the guide vanes 40.

Figure 5:
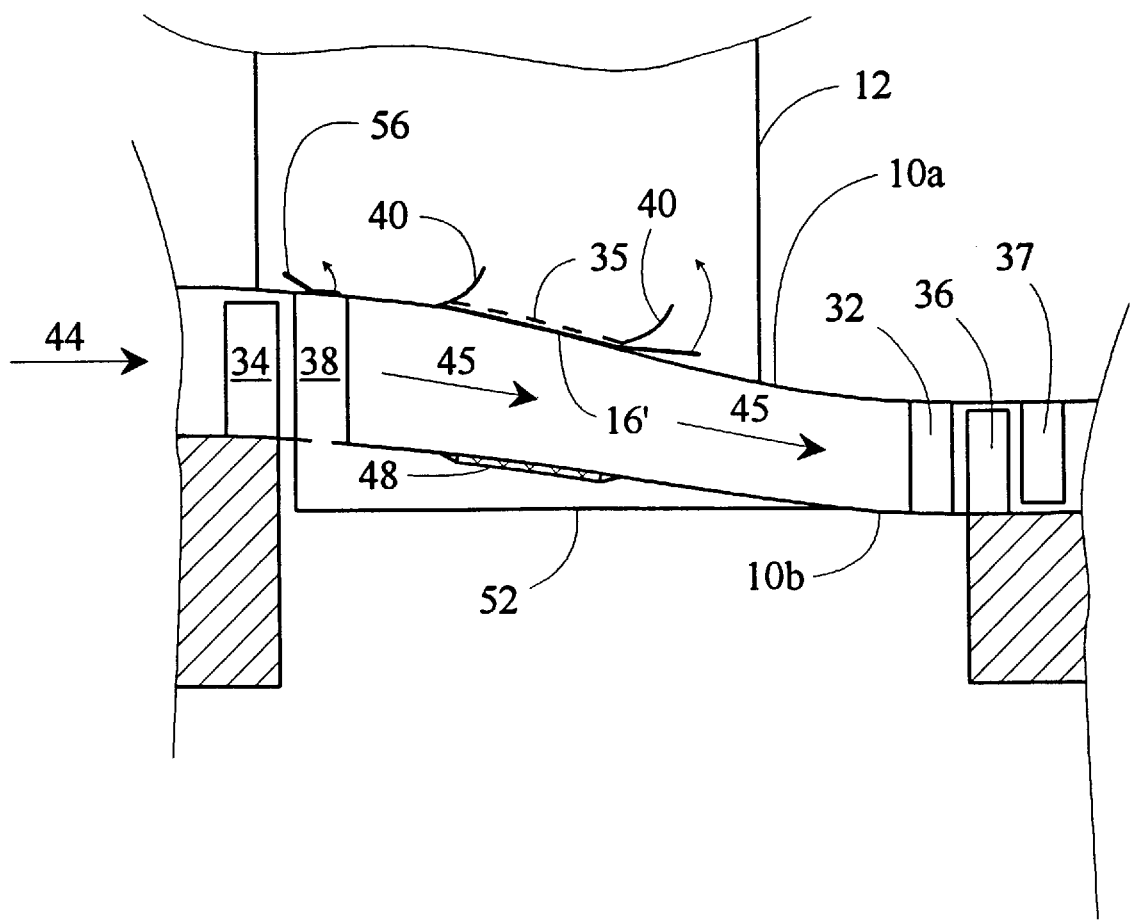
FIG. 5 illustrates a further embodiment of the ICD with a bleed valve in the closed position and a boundary bleed located on the inner surface of the ICD.

Illustrated in FIG. 5 is a longitudinal section of the "swan necked" shaped annular ICD located between the last stage of the LPC (represented by rotor blades 34, outlet guide vanes 39) and the first stage and a half of the IPC (represented by inlet guide vanes 32, rotor blades 36 and stater 37) of a typical multi-spool aero-derivative gas turbine engine. The ICD is similar to that of FIG. 3 in having an annular section 35 with openings located adjacent the flaps 16' of the bleed valve into which air may be discharged from the ICD. Here however the inner wall 10a is fitted with a boundary layer bleed zone as is illustrated at 48. This zone is depicted only schematically, i.e. without inference of precise location or extent. The boundary layer bleed through zone 48 passes into a plenum 52 which is internally located within the inner wall 10b of the ICD, and this plenum communicates with main plenum 12 via passages in hollow outlet guide vanes 39 and valves 56 controlling the outlet from this passage; these are shown in FIG. 5 in the closed position. As with the bleed valve flaps 16', the boundary layer bleed control valves 56 are actuated in unison by a unison ring and linkage. With both bleed valves closed as shown, the partially compressed LPC air all passes to the IPC for full compression.

Figure 6:
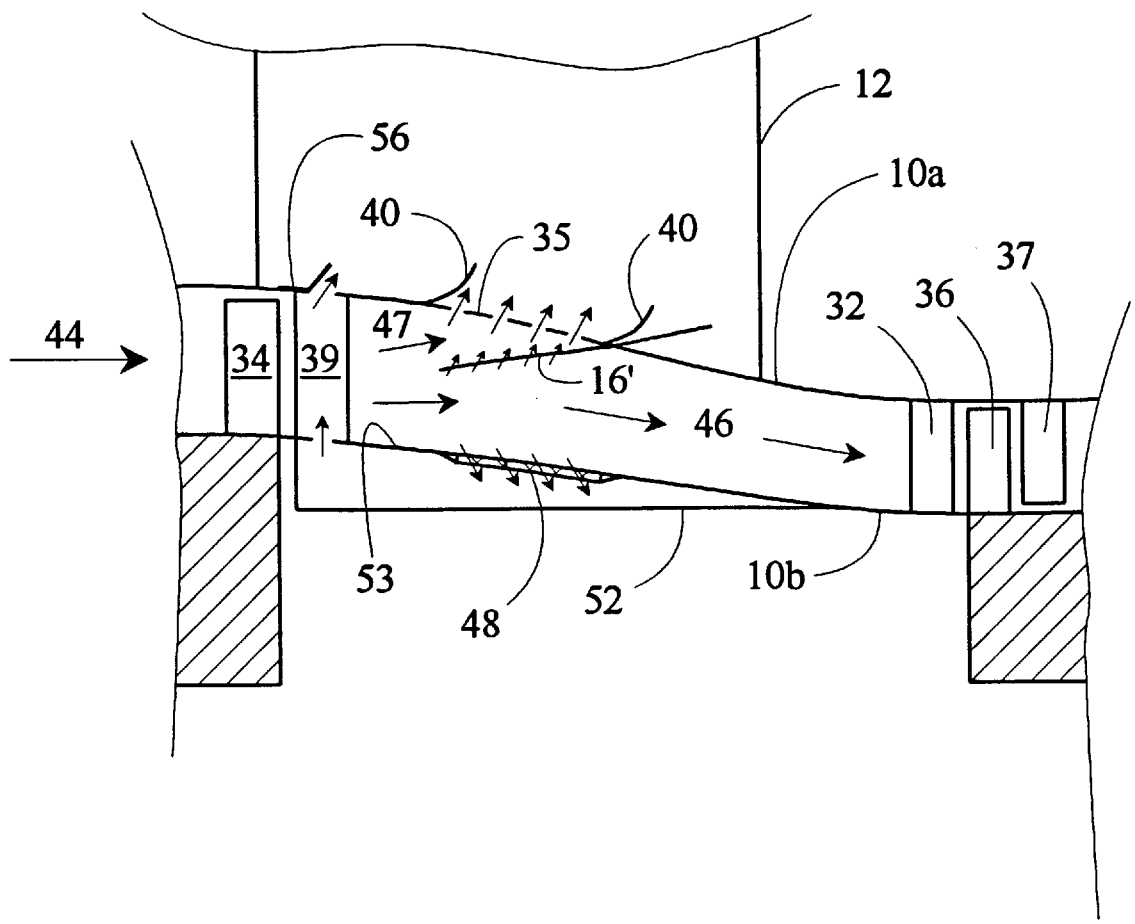
FIG. 6 illustrates a further embodiment of the ICD with the bleed valve in the open position and boundary bleeds located on both the inner surface of the ICD and diffuser.

FIG. 6 is the same as FIG. 5 except that the bleed valve flaps 16' and the boundary layer bleed control valves 56 are shown in the opened position. In this position the flaps bifurcate the airstream into two annular airstreams 46 and 47. Airstream 46 is diffused in a controlled fashion between the upstream end portion 16' of the bleed valve flaps and the inner wall of the ICD, with airstream 47 passing into plenum 12, as described with reference to FIG. 4. In this preferred embodiment, operation is further optimised by bleeding off the boundary layer on the inner wall 10b. This boundary layer, which originates within the LPC, is thick, tired (normal velocity gradient at the wall is nominally zero), and near incipient separation. As a result it will have difficulty negotiating the interior convex portio of the inner surface of the ICD wall 10a. This problem can be eliminated by having valves 56 open to bleed off the boundary layer 53 through the porous portion 48, into the plenum 52, and then exhausting the plenum into the main bleed-off air volute case 12 via internal radial passages through the vanes 39.

A further increase in effectiveness of the diffuser may be obtained by bleeding off the boundary layer 51 which grows on the inside surface of the bleed valve flaps 16', by making these flaps porous. The boundary layer bleed may occur as required to prevent separation from the wall surfaces over selected portions of the annular surface provided by flaps 16', or just where joints occur between the flaps and the sealing elements. The boundary layer bleed is depicted only schematically, i.e. without inference to precise axial location or extent. The amount of air removed in this way is quite small, such as 1 or 2 percent of the total air flow.

I claim:

1. A multi-spool gas turbine engine having an inter compressor duct (10) connecting a low pressure compressor to a further compressor stage, of the kind in which there is provided bleed means (11,16) for bleeding off a variable amount of air from said duct, said duct being annular and having an inner wall (10b) and an outer wall (10a) and having a central axis, and in which said bleed means comprises opening means (11) arranged circumferentially around the outer wall of said duct and pivotally mounted air deflector means (16) for deflecting air flowing in said duct outwardly through said opening means (11), and means (20) for simultaneously pivoting said air deflector means into the path of air flowing in said duct;

characterized in that said air deflector means comprises a circumferential array of flaps,(16) each having an upstream end portion, a downstream inner end, and side edges, said flaps being pivotally mounted at their downstream inner ends (18) so as to be movable between an outer position at which the flaps lie close to said outer wall (10a) and effectively close said opening means, and an inner position in which the flaps have their downstream inner ends near to the outer wall and have their upstream end portions inclined inwardly from the outer wall to divert some of the air flowing in said duct outwardly through said opening means;

and further characterized in that sealing elements (21, 22) are provided movable with said flaps and providing interconnection between the side edges of adjacent flaps to largely prevent radial flow of air between adjacent flaps when the flaps are in all their positions.

2. A gas turbine according to claim 1, wherein said sealing elements are leaves (21) having their edges overlapping with the side edges of adjacent flaps.

3. A gas turbine according to claim 1, wherein said sealing elements are carried by slots in the side edges of adjacent flaps.

4. A gas turbine according to claim 1, wherein said sealing elements are extensions of the side edges of said flaps which overlap with the side edges of adjacent flaps.

5. A gas turbine engine according to claim 1, wherein the means for causing said axial movement of the flaps is an actuator ring connected to all of said flaps.

6. A gas turbine engine according to claim 1, further characterized in that there are provided openings (48) in said inner wall which lead into a chamber connected to a plenum (12) by valve means (56), said valve means when open allowing air adjacent to said inner wall to be bled off from said duct.

7. A gas turbine according to claim 6, wherein said chamber is connected to said plenum by passages in outlet guide vanes (39) of said low pressure compressor, said valve means (56) regulating the flow of air in said passages.

* * * * *